(12) United States Patent
Ward et al.

(10) Patent No.: US 8,665,457 B2
(45) Date of Patent: Mar. 4, 2014

(54) POSTSCRIPT STREAM INTERPRETER WITH INTEGRATED PAGINATION

(75) Inventors: David Ward, Broomfield, CO (US); Martin Wirth, Bailey, CO (US)

(73) Assignee: Ricoh Company, Ltd., Tokyo (JP)

( * ) Notice: Subject to any disclaimer, the term of this patent is extended or adjusted under 35 U.S.C. 154(b) by 974 days.

(21) Appl. No.: 12/721,391

(22) Filed: Mar. 10, 2010

(65) Prior Publication Data

US 2011/0222091 A1    Sep. 15, 2011

(51) Int. Cl.
*G06F 15/00* (2006.01)
(52) U.S. Cl.
USPC .......................................................... 358/1.13
(58) Field of Classification Search
USPC ........................................................ 358/1.13
See application file for complete search history.

(56) References Cited

U.S. PATENT DOCUMENTS

| 5,542,031 A * | 7/1996 | Douglass et al. ............ 358/1.15 |
| 6,175,846 B1 | 1/2001 | Shively |
| 2009/0080025 A1 | 3/2009 | Aronshtam et al. |

* cited by examiner

*Primary Examiner* — Saeid Ebrahimi Dehkordy
(74) *Attorney, Agent, or Firm* — Duft Bornsen & Fettig LLP

(57) ABSTRACT

Systems and methods presented herein provide for the processing of PostScript print jobs that are not DSC compliant. A single stream of a PostScript data is processed and divided into multiple streams (e.g., page objects), each comprising data operable to render an individual page. In one embodiment, a method includes receiving the PostScript data stream and identifying object tokens in the PostScript data stream. An object token is operable to generate a PostScript object or execute a PostScript operation. A portion of the object tokens may be operable to define page boundaries in the PostScript data stream. The method also includes analyzing the object tokens to parse the object tokens into a plurality of page objects, separating the page objects into a plurality of data paths, and parallel processing the page objects through the data paths to rasterize the PostScript data stream on a page by page basis.

17 Claims, 5 Drawing Sheets

POSTSCRIPT STREAM INTERPRETER WITH INTEGRATED PAGINATION

BACKGROUND

1. Field of the Invention

The invention relates to the field of PostScript data stream processing, wherein the PostScript data stream is not compliant with PostScript Document Structuring Conventions (DSC).

2. Statement of the Problem

PostScript is a page description language (PDL) that contains a set of commands that are used to describe pages in a print job. A principal difference between PostScript and other PDLs is that PostScript is a programming language. This provides power and flexibility in expressing page content, although the pages are not easy to interpret. In order to correctly interpret pages or perform meaningful transformations on PostScript data, a PostScript interpreter is needed. Adobe Configurable PostScript Interpreter (CPSI) is one example of a PostScript interpreter, which processes a PostScript job and produces bitmaps. Adobe Distiller is another example of a PostScript interpreter, which processes a PostScript job and produces a PDF file. However, certain limitations exist within the PostScript language. For example, speed limitations prevent PostScript print jobs to be executed at printer-rated speeds. Also, PostScript print jobs cannot be separated into independent pages, as required for executing pages in parallel on multiple central processing units (CPUs).

The processing of a PostScript job generally consists of two (typically overlapping) stages; an interpretation-stage and an output-stage. During interpretation, a PostScript job is parsed and the internal job structure is created. This internal job structure may be a linked list of high-level and low-level graphical objects, a complex state that describes pages in the job, etc. During the output stage, the internal job structure is processed, and the required output is created. In case of a printing system, pages are rendered and rasterizes as, for example, a raw bitmap for printing.

Interpretation is considered as a "light stage", while rendering is considered as a "heavy stage" as far as the amount of data produced. For example, typical source data for a PostScript page that contains text and graphics is about 100 KB. When rendered at 600 times 600 dpi CMYK, a typical raw bitmap page is about 100 MB, which is 1,000 times larger than the source data. Thus, in order to skip rendering, a technique of "writing to null device" has been used since the inception of the PostScript language.

With the null device technique, rendering of pages may be skipped by setting a null device and then re-establishing a real device to resume rendering. The null-device approach is typically augmented by redefinition of multiple PostScript operators (e.g. show, image, etc.) to further reduce the interpretation overhead. The pages may then be rendered in parallel. For example, four processors may be configured to receive an entire PostScript job with each processor skipping some pages and processing others. To illustrate, a first processor may process pages 1, 5, 9 . . . , while a second processor processes pages 2, 6, 10 . . . , a third processor processes pages 3, 7, 11 . . . , and a fourth processor processes pages 4, 8, 12 . . . .

The advantages of this approach are easily recognizable. For example, assume that it takes a single-CPU system 100 seconds to process the entire job. Then further assume that interpreting is four times faster than rendering, which is fairly reasonable. Based on these assumptions the interpretation takes 20 seconds, while rendering takes 80 seconds. Each of the four processors then spends the same 20 seconds for interpreting (each processor needs to interpret the entire job), but only 20 seconds for rendering (each processor needs to render only a quarter of the pages). In this case the entire job is processed in 40 seconds. This achieves 2.5 times performance gain (100/4=2.5). However, this centralized interpreter approach makes the interpreter the bottleneck in parallel processing because the interpreter processing time is constant. In other words, the processing time of the interpreter does not decrease according to the number processors being used to render the print job. Thus, removing the processing bottleneck associated with the interpreter would increase the overall speed of PostScript processing.

Realizing the issues related to unstructured nature of PostScript jobs, Adobe published "Adobe Document Structuring Conventions Specification Version 1" (DSC Specifications) around 1986. The DSC specification defines a set of tags that allows easy parsing of PostScript resources and rearranging of pages. Now, one can successfully split a large set of PostScript jobs into independent pages by parsing for DSC comments and producer-specific patterns. DSC also allows for the combination of multiple PostScript jobs produced by different applications into one PostScript job, thus achieving an even higher level of page independence.

For example, PostScript interpreters receive a single stream input and produce a single sequential rasterized output to be rendered into graphics on a display or printing hardware. The stream contains data for each page in sequence. But, PostScript cannot be parsed using a fixed set of rules because the language itself is usually redefined by data streaming into the interpreter unless the document complies with the PostScript Document Structuring Convention (DSC). If the PostScript document is DSC compliant then standardized comments may be used as delimiters to split and reassemble a document in a page-wise manner. Pages described in a PostScript print job stream may have zero or more dependencies on any data presented by the stream before prior pages are rendered. PostScript interpreters populate dictionaries to track how procedures and parameters are defined. Subsequent pages may call and use these definitions. Every definition which a valid page rendering sequence uses may be located anywhere inside previous pages of the PostScript print job stream. In DSC compliant PostScript, all the information needed to render each page is located in the prolog or after the last page was rendered. However, several applications produce PostScript that is not DSC compliant and manipulation of individual pages is still desired to improve parallel processing.

SUMMARY

The systems and method presented herein provide for the processing of PostScript print jobs that are not DSC compliant. More specifically, a single stream of a PostScript data is processed and divided into multiple streams (e.g., page objects), each comprising data operable to render an individual page. The process employs a synchronous external PostScript interpreter to determine which object token contains a page object operation (a.k.a. a "showpage" operation).

In one embodiment, a method provides for rendering a PostScript data stream having PostScript parameters that are not Document Structure Conventions (DSC) compliant. The method includes receiving the PostScript data stream and identifying object tokens in the PostScript data stream, wherein an object token is operable to generate a PostScript object or execute a PostScript operation. A portion of the object tokens may be operable to define page boundaries in the PostScript data stream. The method also includes analyzing the object tokens to parse the object tokens into a plurality of page objects, separating the page objects into a plurality of data paths, and parallel processing the page objects through the data paths to rasterize the PostScript data stream on a page by page basis.

Analyzing the object tokens to parse the object tokens into a plurality of page objects may include PostScript interpreting the object tokens to generate the page objects. The method may further include separating the page objects into a plurality of data paths dividing a total number of page objects in the PostScript data stream by a total number of the data paths buffering about a same number of page objects in each data path. For example, once the page objects have been interpreted by a PostScript interpreter, they may be directed along separate data paths for rasterization. In doing so, roughly the same number of page objects may be processed along each data path. However, other load-balancing techniques may be used to account for page objects requiring further processing during rasterization. Additionally, separating the page objects into the data paths may include buffering each of the page objects for rendering and generating a null page object for each page object that indicates a nonexistent page in the PostScript data stream after the page object has been buffered for rendering.

The method may further include synchronizing PostScript interpreting with identifying object tokens to correctly associate each object token with a PostScript page. The method may also include buffering each of the object tokens according to their respective page objects. Additionally, once buffered, the object tokens may be used in processing subsequent pages. For example, certain object tokens may be the same within other pages. As such, the information associated with the object tokens may be re-used within subsequent pages. In this regard, buffered object tokens may be used recreate the instructions of a subsequent PostScript data stream to perform the same set of operations and state changes in the PostScript interpreter.

In another embodiment, a system is provided for rendering a PostScript data stream having PostScript parameters that are not Document Structure Conventions (DSC) compliant. The system includes a PostScript token processor operable to receive the PostScript data stream and identify object tokens in the PostScript data stream. An object token is operable to generate a PostScript object or execute a PostScript operation. The system also includes an assembler operable to parse the object tokens into a plurality of page objects and a PostScript interpreter or operable to interpret the page objects for rendering. The assembler is further operable to separate the interpreted page objects into a plurality of data paths for rasterization of the page objects through data paths on a page by page basis.

In another embodiment, the printing system provides for interpreting, rendering, and printing a PostScript data stream. The printing system includes a print controller operable to render the PostScript data stream. The PostScript data stream comprises PostScript parameters that are not Document Structure Conventions (DSC) compliant. The print controller includes a PostScript token processor operable to receive the PostScript data stream and identify object tokens in the PostScript data stream. An object token is operable to generate a PostScript object or execute a PostScript operation. The print controller also includes an assembler operable to parse the object tokens into a plurality of page objects and a PostScript interpreter operable to interpret the page objects for rendering. The assembler is further operable to separate the interpreted page objects into a plurality of data paths for rasterization of the page objects through data paths on a page by page basis. The printing system also includes a printer operable to print the rendered page objects onto a tangible medium.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
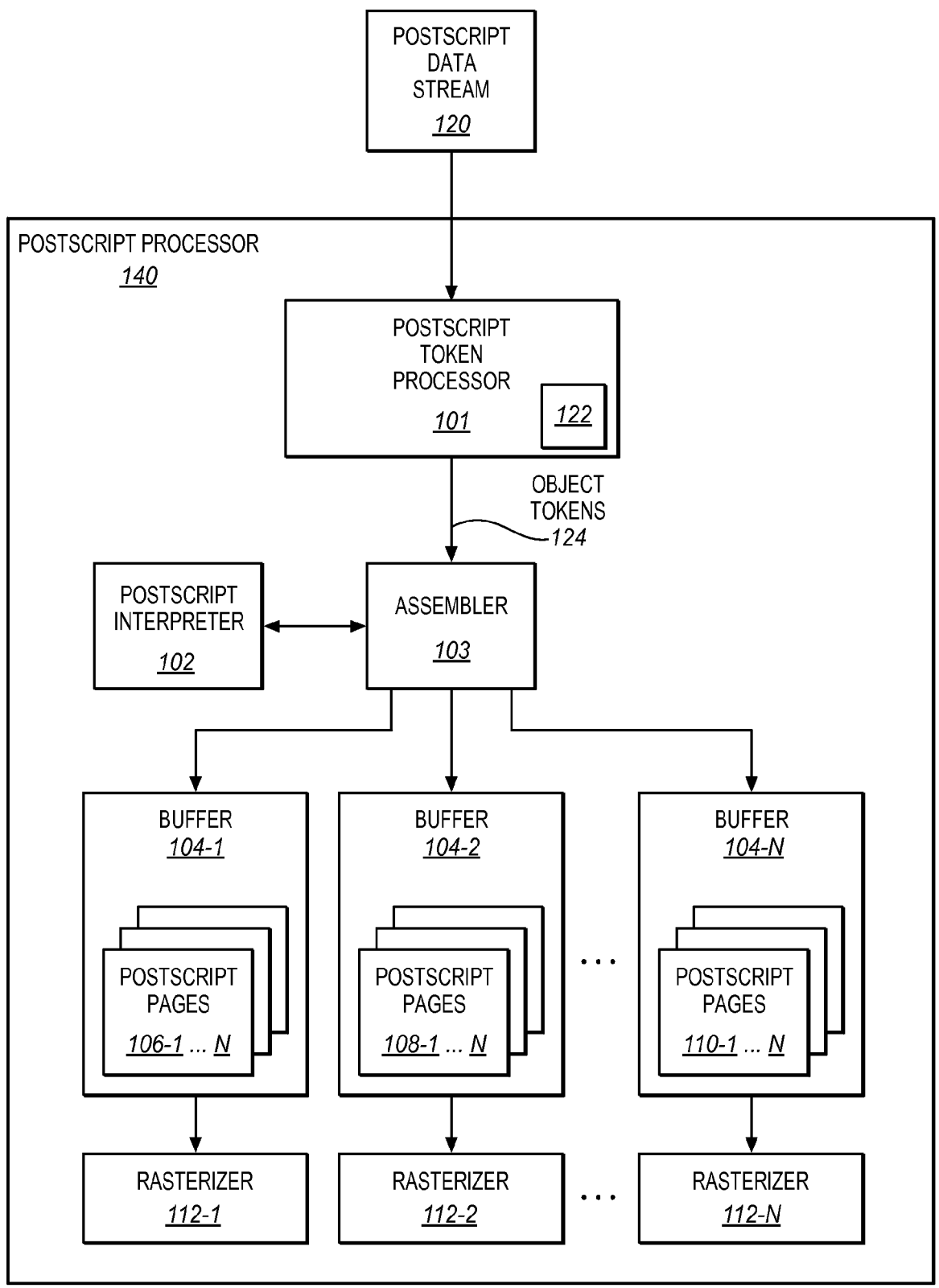
FIG. 1 is a block diagram illustrating a PostScript processor that is operable to process a PostScript data stream having parameters that are not DSC compliant, in one exemplary embodiment.

FIG. 1 is a block diagram illustrating an exemplary PostScript processor 140 that is operable to process a PostScript data stream 120 having parameters that are not DSC compliant. More specifically, the PostScript processor 140 is configured for segmenting the PostScript data stream 120 into page descriptions that may be rendered by a printer or a display device. The PostScript processor 140 includes a PostScript token processor 101, a PostScript interpreter 102, an assembler 103, and buffers 104-1 . . . N (where N is an integer greater than 1 but not necessarily equal to any other N depicted herein). The PostScript processor 140 also includes rasterizers 112-1 . . . N.

The PostScript token processor 101 is any structure operable to convert the incoming PostScript data stream 120 into object tokens 124. The object tokens 124 are segments of the post data stream 120 that cause the PostScript interpreter 102 to create an object, execute an operation, or change a read state of the PostScript interpreter 102. The objects may include items as simple as numbers, names, strings, or even composites of such objects including arrays and procedures. The objects can also include operators that cause non-executable objects on an operand stack to be inserted into a dictionary (yet another type of object). In all, the objects are used to configure page objects that may be used to generate Post- Script pages 106-1 ... N, 108-1 ... N, and 110-1 ... N. The PostScript token processor 101 is also operable to store, at least temporarily, the object tokens 124 within the object token buffer 122 for purposes that are defined below.

The PostScript interpreter 102 is any structure operable to interpret, or otherwise convert images of a PostScript data stream 120 into sheetside bitmaps. The sheetside bitmaps generated by the PostScript interpreter 102 are each a 2-dimensional array of pixels representing an image of the print job, also referred to as full sheetside bitmaps or PostScript pages 106-1 ... N, 108-1 ... N, and 110-1 ... N. The 2-dimensional pixel arrays are considered "full" sheetside bitmaps because the bitmaps include the entire set of pixels for the image. The PostScript interpreter 102 is operable to interpret multiple raw sheetsides concurrently so that the rate of rendering substantially matches the rate of imaging of production print engines.

The assembler 103 is any structure operable to initiate duplex communication with the PostScript interpreter 102, send prepended PostScript procedures to the PostScript interpreter 102, and receive feedback therefrom. The assembler 103 may also be operable to specify operating parameters (e.g., the prepended PostScript procedures) to synchronize the PostScript interpreter 102 and detect page objects (i.e., showpages).

The buffers 104-1 ... N represent any structures capable of storing PostScript pages 106-1 ... N, 108-1 ... N, and 110-1 ... N (e.g., computer memory) as interpreted by the PostScript interpreter 102. In this regard, the buffers 104 may represent data paths for parallel processing via the rasterizers 112-1 ... N. The rasterizers 112-1 ... N represent any structures operable to convert, or render, the PostScript pages 106-1 ... N, 108-1 ... N, and 110-1 ... N into a raster images (i.e., consisting of pixels or dots) for output to a display, a printer, or a storage module (e.g., computer memory) in a bitmap file format.

Figure 2:
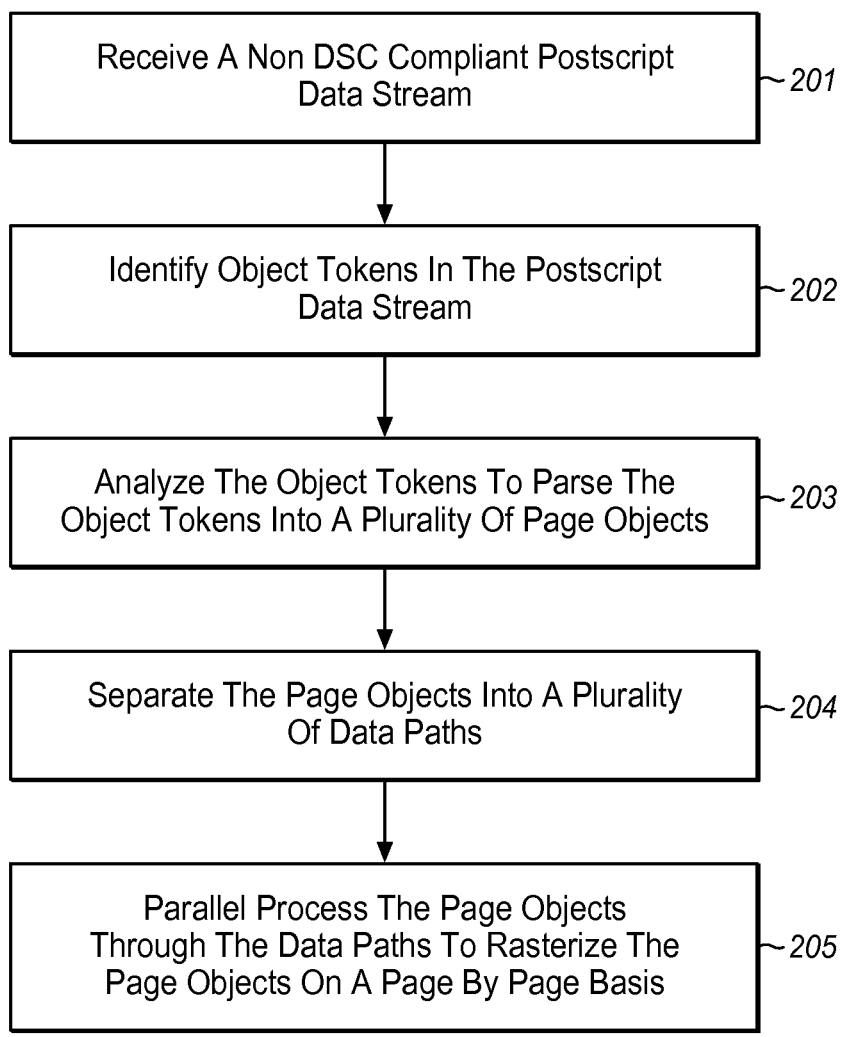
FIG. 2 is a flowchart illustrating a method of processing the PostScript data stream, in one exemplary embodiment.

FIG. 2 is a flowchart 200 illustrating a method of processing a PostScript data stream 120. More specifically, the method provides for the parallel processing of individual pages as the pages in the PostScript print job are identified and extracted by the processing described herein. The flowchart 300 initiates when the PostScript processor 140 receives a PostScript data stream 120 in the process element 201. As mentioned, the PostScript data stream 120 includes PostScript parameters that are not DSC compliant. The PostScript token processor 101 identifies and processes object tokens 124 in the PostScript data stream 120, in the process element 202. For example, when PostScript data is first streamed into the PostScript token processor 101, it is segmented into object tokens 124 by the PostScript token processor 101. In this regard, the PostScript token processor 101 applies a set of rules used by a level 3 PostScript interpreter (See e.g., PostScript Language Reference, 3rd Edition, Adobe Systems Incorporated, 1999, ISBN 0-201-37922-8) to parse the PostScript data stream 120 into object tokens 124.

The PostScript token processor 101 analyzes the object tokens 124 such that they may be parsed into a plurality of page objects, in the process element 203. For example, the PostScript token processor may ascertain information pertaining to the object tokens 124 such that page boundaries may be determined and page objects generated. As mentioned, the object tokens 124 serve a variety of individual purposes including determining page boundaries. As the PostScript token processor 101 reads the PostScript data stream 120, the PostScript token processor 101 changes state depending on whether it is reading simple text, whitespace, names, strings, hexadecimal data, procedures, or encoded binary data. The PostScript token processor 101 accepts a list of object token patterns that causes it to switch read states so that it may successfully process encoded binary data, such as base 85-encoded binary strings. The PostScript token processor 101 buffers all of the object tokens 124 that it segments out of the PostScript data stream 120 into the token buffer 122. The raw output of the token buffer 122 may be used recreate the instructions of a subsequent PostScript data stream to perform the same set of operations and state changes in the PostScript interpreter 102. This constitutes a positive acceptance test of the PostScript token processor 101.

The assembler 103 may use the information from the PostScript token processor 101 to generate page objects. From there, the PostScript interpreter 102 interprets the page objects and the assembler 103 separates the interpreted page objects into a plurality of data paths, in the process element 204, such that the rasterizers 112-1 ... N may parallel process the interpreted page objects on a page by page basis, in the process element 205.

Figure 3:
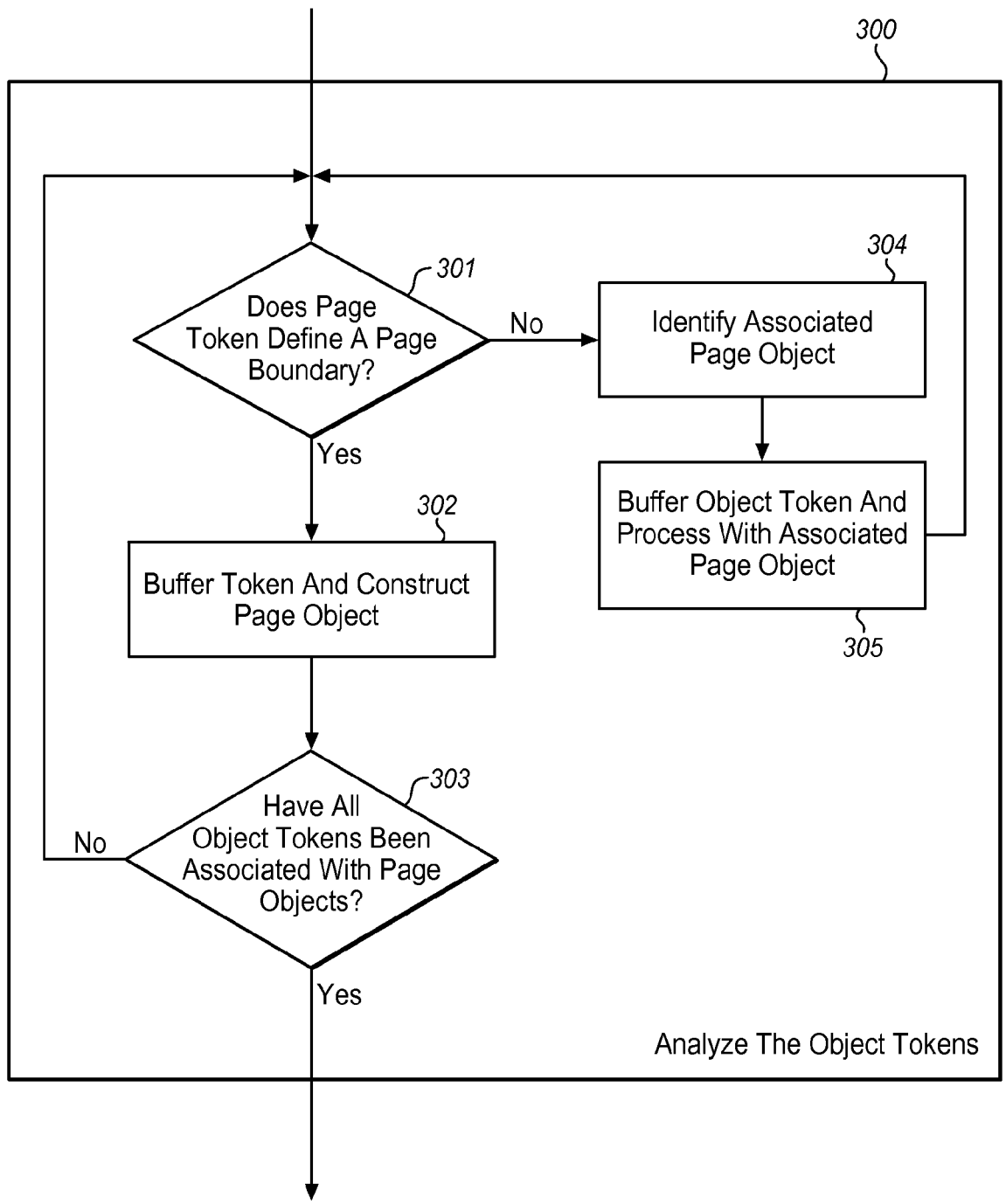
FIG. 3 is a flowchart illustrating analysis of object tokens within the processing of FIG. 2, in one exemplary embodiment.

FIG. 3 is a flowchart illustrating analysis 300 of the object tokens 124 within the processing of FIG. 2 in an exemplary embodiment. As mentioned, a PostScript token processor 101 receives the object tokens 124 and analyzes them. During this analysis, the PostScript token processor 101 determines whether a particular object token 124 defines a page boundary in the process element 301. If so, the PostScript token processor 101 buffers the object token 124 in the token buffer 122 for future use and passes the object token to the assembler 103 for construction of a page object, in the process element 302. If the object token 124 does not define a page boundary, the PostScript token processor 101 identifies the page object to which the object token 124 is associated, in the process element 304. Once identified, the PostScript token processor 101 buffers the object token 124 in the token buffer 122 for future use, in the process element 305, and transfers the object token 124 to the assembler 103 for construction of the page object.

Once each of the page objects has been constructed, the PostScript token processor 101 continues analyzing the PostScript data stream 120 to determine whether all of the object tokens 124 have been associated with their respective page objects, in the process element 303. If not, the process of analyzing the object tokens 124 returns to the process element 301 to continue processing the object tokens within the PostScript data stream 120. Otherwise, the assembler 103 may begin its process of interpreting the page objects. For example, as the page objects are assembled by the assembler 103, the assembler transfers the page objects to the PostScript interpreter 102 for interpretation.

The assembler 103 starts the PostScript interpreter 102 in pipe-to-stdin mode and initiates a first-in-first-out (FIFO) feed to send data to the PostScript interpreter 102's stdin. The object tokens 124 and synchronization requests may be sent through this channel. The stdout channel of the PostScript interpreter 102 is also connected to another FIFO that is read by a read thread of the assembler 103. Pipe-to-stdin, FIFO, stdin, and stdout are terms known to those skilled in the art.

Generally, page object generation and interpretation are operated as a loop with feedback to the assembler 103. For example, although PostScript interpreters allow input through a console command line, more trivial examples of PostScript generally only result in error-free interaction. The PostScript processor 140 uses a subset of PostScript that runs through an execute method. Such performs well for testing but is relatively ineffective when the PostScript data stream 120 changes read state between command lines. Thus, the PostScript interpreter 102 may be configured to operate in pipe mode. Unlike a command line which issues a prompt, pipe mode does not provide means to synchronize the PostScript interpreter 102 with the assembler 103. Synchronization without any further effort is sustained by keeping the object token feed rate of the assembler 103 slow enough so that there is little or no chance for it to race ahead of the PostScript interpreter 102. If the PostScript interpreter 102 processes an object token 124 that calls for a signal upon completion, then the signal is received with a subsequent object token 124. If the assembler 103 is ahead of the PostScript interpreter 102 and a showpage hit signal occurs, the assembler 103 indicates the object token 124 is incorrect.

Synchronization may be maintained by giving each signal request an identifier that is associated with a specific object token 124. The assembler 103 tracks synchronization replies from the PostScript interpreter 102, which indicates when the PostScript interpreter 102 operations invoked by the object token are complete. The assembler 103 then adjusts its timing to stay in sync with the PostScript interpreter 102. Although PostScript is a postfix language, it is not entirely disciplined in this regard. Procedures may be written that change the read state. However, this effectively places a value construct after an operation in the PostScript data stream 120 and prohibits blocking of the PostScript data stream 120, because the object token 124 initiates the read-state change and the PostScript interpreter 102 does not respond until the following data is completely read. Waiting for a reply before sending a subsequent object token 124 may "deadlock" the duplex communications loop. Accordingly, synchronization signals are not used to block the sending of a subsequent object token 124 while waiting for the PostScript interpreter 102 to complete its previous task. Synchronization is used to optimize timing.

Another problem introduced by prefixing operations to values in PostScript is that synchronization requests are not allowed between the read-state change operator and its following data. Such a request would be interpreted as part of the PostScript data stream 120 and present an error. The PostScript token processor 101 tracks which operators cause such changes in the read state. In this regard, the PostScript token processor 101 informs the assembler 103 whether it is allowed to send a synchronization request after a specific object token 124.

Other issues that may affect synchronization include the PostScript interpreter itself. For example, a variety of PostScript Interpreters may be used as the PostScript interpreter 102. A Ghostscript interpreter operating in an interactive mode can affect synchronization because the interpreter requires interaction from a user. To overcome such, a configurable PostScript interpreter may be used to make multiple application programming interface (API) calls that allow archive equivalent synchronization.

The PostScript token processor 101 however, is not a full-fledged interpreter. Instead, the PostScript token processor 101 follows a subset of PostScript language specifications. Accordingly, the PostScript token processor 101 does not detect read-state operators solely by reading and parsing the PostScript data stream 120. In this regard, heuristic rules are provided to the PostScript token processor 101 to enable it to recognize the presence of known resources in the PostScript data stream 120 that provide such operators. When the PostScript token processor 101 detects one of these resources, it creates a list of its read-state change operators and uses that list to detect subsequent read-state change operators.

Procedures are also provided to the assembler 103 to prepend to the incoming PostScript data stream 120. These procedures provide utilities and can request a unique synchronization signal, signal on loop entry, track loop depth, and signal on a showpage operator. In this regard, the assembler 103 receives the synchronization feedback from the PostScript interpreter 102 via a reply thread. If the synchronization is consistently off, then the object token feed rate may be reduced. A delay, however, would tend to slow the overall process. Accordingly, a read thread may be used to detect when the PostScript interpreter 102 has replied to a request and interrupt any delay. These interruptions may be tracked and used to optimize synchronization.

Long-running loops can also effect synchronization, so they are also set to notify the assembler 103. In turn, the assembler 103 allows for a loop to complete so as to not delay the loop (e.g., being caused by a loop to linear timing of non-looping object tokens 124). The assembler 103 generally has enough information to know whether a showpage signal actually applies to the last object token 124 sent to the PostScript interpreter 102. If showpage operations are inconsistent or out-of-sync, the assembler 103 can interrupt the process, adjust the timing formula, reinitialize the PostScript interpreter 102, and read the token buffer 122 until the point where it may resume reading from the input PostScript data stream 120. When timing is correct, the assembler 103 receives a signal for every showpage operator.

Upon receiving a showpage signal, the assembler 103 also calls a method in the PostScript token processor 101 to write out the token buffer 122 to a file. On the first page, the PostScript token processor 101 simply outputs the contents of the object token buffer 122. After outputting the object token buffer 122, the assembler 103 marks the showpage object token 124 as a prior showpage. Subsequent page outs cause the PostScript token processor 101 to replace prior showpage object tokens 124 with an internally predefined "erasepage initgraphics" object token. For example, merely replacing a showpage operator for non-printing pages costs the PostScript interpreter 102 CPU cycles in computing paths and rendering operations that are ultimately discarded. This problem is solved by prepending PostScript procedures that replace a valid display device with a null device. The PostScript interpreter 102 then recognizes that every rendering operation in that state remains in place and skips computationally intensive parts of the operation. The rendering operations then pop their respective parameters off the operand stack and do nothing else.

For diagnostic purposes, the PostScript token processor 101 can also track its progress from the commencement of the input stream in bytes. The PostScript token processor 101 may also count end-of-line (EOL) characters not found inside strings to provide a line-based location utility. This data may be attached to the object tokens 124 by the PostScript token processor 101.

Figure 4:
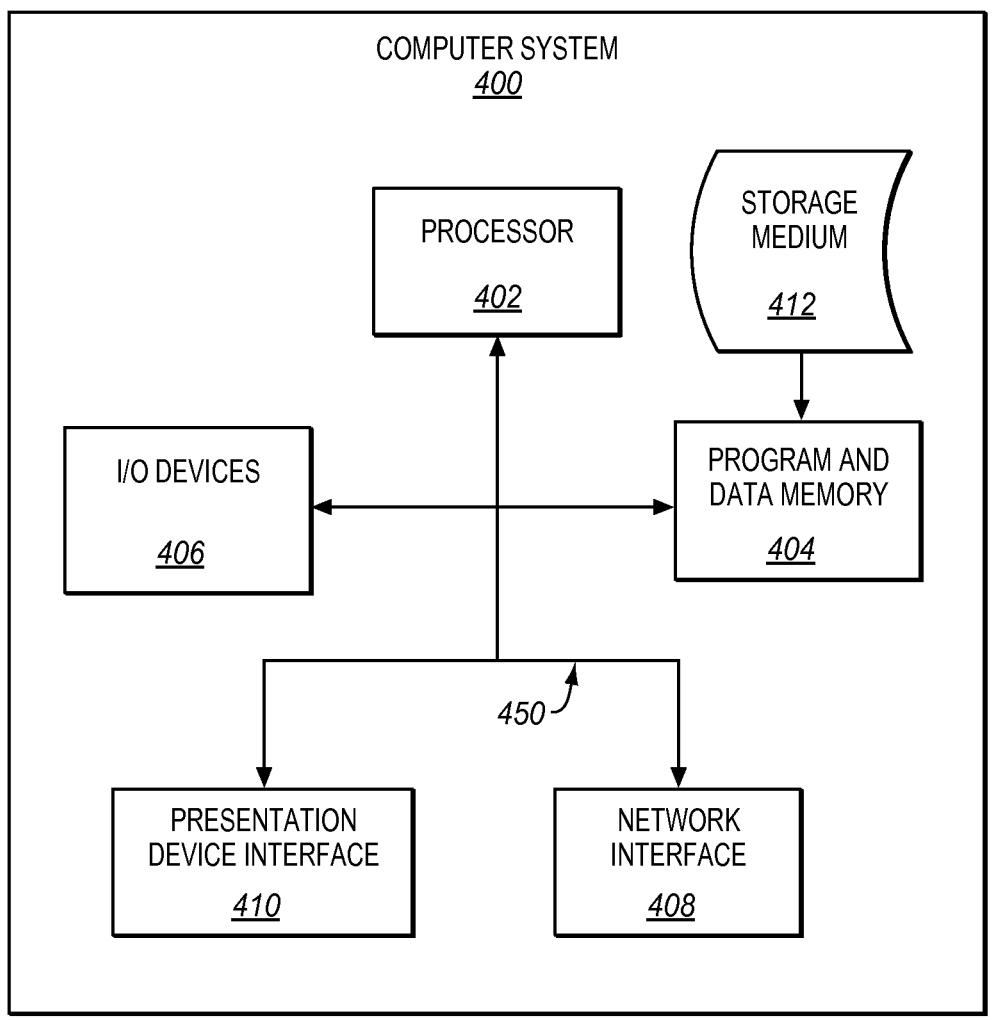
FIG. 4 illustrates a computer system operable to execute computer readable medium embodying programmed instructions to perform desired functions, in one exemplary embodiment.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc. FIG. 4 is a block diagram depicting a computer system 400 operable to provide features and aspects hereof by executing programmed instructions and accessing data stored on a computer readable storage medium 412.

Furthermore, embodiments of the invention can take the form of a computer program product accessible from the computer-readable storage medium 412 providing program code for use by the computer processing system 400. For the purposes of this description, a computer readable medium can be any apparatus that can contain, store, communicate, or transport the program for use by the processing system. The medium can be an electronic, magnetic, optical, electromagnetic, or infrared. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and DVD.

The computer system 400, being suitable for storing and/or executing program code, includes at least one processor 402 coupled to memory elements 404 through a system bus 450. The memory elements 404 can include local memory employed during actual execution of the program code, bulk storage, and cache memories which provide temporary storage of at least some program code and/or data in order to reduce the number of times code and/or data must be retrieved from bulk storage during execution.

Input/output or I/O devices 406 (including but not limited to keyboards, displays, pointing devices, etc) can be coupled to the system either directly or through intervening I/O controllers. Network adapter interfaces 408 may also be coupled to the system to enable the computer system 400 to become coupled to other data processing systems or storage devices through intervening private or public networks. Modems, cable modems, IBM Channel attachments, SCSI, Fibre Channel, and Ethernet cards are just a few of the currently available types of network or host interface adapters. The presentation device interface 410 may be coupled to one or more presentation devices, such as printing systems and displays for presentation of presentation data generated by the processor 402.

Figure 5:
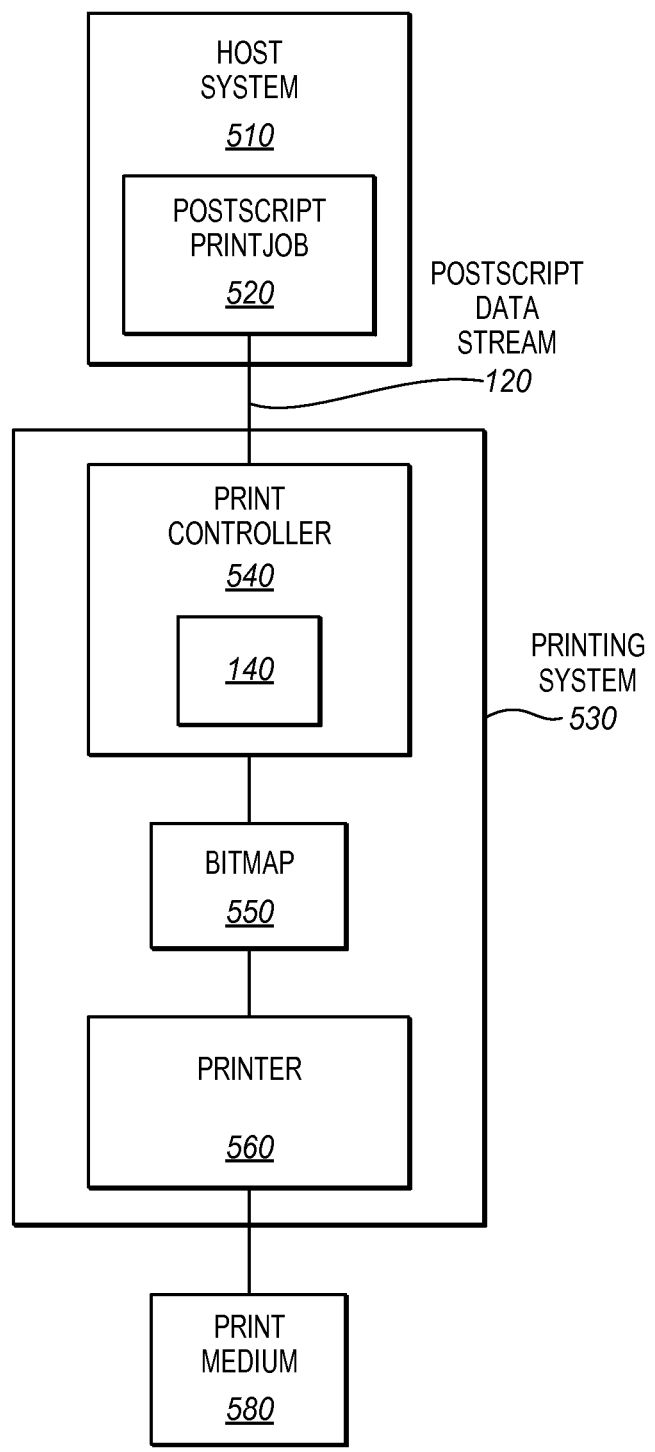
FIG. 5 is a block diagram illustrating a printing system, in one exemplary embodiment.

FIG. 5 is a block diagram illustrating a printing system 530 in an exemplary embodiment. A host system 510 is in communication with the printing system 530 to print a PostScript print job 520 onto a print medium 580 (e.g., paper) via a printer 560. The resulting print medium 580 may be printed in color and/or in any of a number of gray shades, including black and white, via Cyan, Magenta, Yellow, and blacK (i.e., CMYK). The host system 510 may comprise any computing device, such as a personal computer, a server, or even a digital imaging device, such as a digital camera or a scanner. The PostScript print job 520 includes PostScript data, commands, and functionality that are streamed (i.e., the PostScript data stream 120) to a print controller 540 describe how an image should be printed on a sheet of print medium 580. The PostScript data, commands, and functionality direct the print controller 540 to process the PostScript print job 520 and generate a bitmap 550 for printing to the print medium 580 via the printer 560. The PostScript data, commands, and functionality direct are not Document Structure Conventions (DSC) compliant. That is, the PostScript print job 520 does not include DSC functionality for parsing PostScript resources and rearranging pages.

The printing system 530 may accommodate relatively high-speed printing (e.g., greater than 100 pages per minute). The print medium 580 may be continuous form paper, cut sheet paper, and/or any other tangible medium suitable for printing. The printing system 530, in one generalized form, includes the printer 560 that presents the bitmap 550 onto the print medium 580 (e.g., via toner, ink, etc.) based on the PostScript print job 520.

The print controller 540 may be any system, device, software, circuitry and/or other suitable component operable to transform the PostScript print job 520 for generating the bitmap 550 in accordance with printing onto the print medium 580. In this regard, the print controller 540 may include processing and data storage capabilities. For example, the print controller 540, in its generalized form, includes the PostScript processor 140. These components may represent hardware used to implement the PostScript data stream processing described above. Alternatively or additionally, the separate components may represent logical blocks implemented by executing software instructions in a processor of the printer controller 540. Accordingly, the invention is not intended to be limited to any particular implementation as such may be a matter of design choice.

The print controller 540 may also include other elements that are not shown for the sake of brevity. One example of such an element includes a half toning module that is operable to represent the sheetside bitmaps as halftone patterns of toner. For example, the half toning module may convert the pixels to halftone patterns of CMYK toner for application to the paper. Once computed, the half toning module transfers the converted sheetside bitmaps to the printer 560 to apply the toner to the print medium 580. Examples of other modules that a print controller is known to include are a print job storage system, a raw data preprocessing system, and a bitmap processing system.

Although specific embodiments have been described herein, the scope of the invention is not limited to those specific embodiments. Accordingly, the scope of the invention is only defined by the following claims and any equivalents thereof.

We claim:

1. A method of rendering a PostScript data stream, the method comprising:
   receiving the PostScript data stream, wherein the PostScript data stream comprises PostScript parameters that are not Document Structure Conventions (DSC) compliant;
   identifying object tokens in the PostScript data stream, wherein an object token is operable to generate a PostScript object or execute a PostScript operation;
   analyzing the object tokens to parse the object tokens into a plurality of page objects;
   separating the page objects into a plurality of data paths; and
   parallel processing the page objects through the data paths to rasterize the PostScript data stream on a page by page basis,
   wherein separating the page objects into a plurality of data paths comprises:
   buffering each of the page objects for rendering; and
   generating a null page object for each page object that indicates a nonexistent page in the PostScript data stream after the page object has been buffered for rendering.

2. The method of claim 1, wherein a portion of the object tokens define page boundaries in the PostScript data stream.

3. The method of claim 1, wherein separating the page objects into a plurality of data paths comprises:
   dividing a total number of page objects in the PostScript data stream by a total number of the data paths; and
   buffering about a same number of page objects in each data path.

4. The method of claim 1, wherein analyzing the object tokens to parse the object tokens into a plurality of page objects comprises PostScript interpreting the object tokens to generate the page objects.

5. The method of claim 4, further comprising synchronizing said PostScript interpreting with said identifying object tokens to correctly associate each object token with a PostScript page.

6. The method of claim 1, further comprising buffering each of the object tokens according to their respective page objects.

7. A system for rendering a PostScript data stream, wherein the PostScript data stream comprises PostScript parameters that are not Document Structure Conventions (DSC) compliant, the system comprising:
- a PostScript token processor operable to receive the PostScript data stream and identify object tokens in the PostScript data stream, wherein an object token is operable to generate a PostScript object or execute a PostScript operation;
- an assembler operable to parse the object tokens into a plurality of page objects; and
- a PostScript interpreter or operable to interpret the page objects for rendering, wherein the assembler is further operable to separate the interpreted page objects into a plurality of data paths for rasterization of the page objects through data paths on a page by page basis,
- wherein the assembler is further operable to buffer each of the page objects for rendering and generate a null page object for each page object that indicates a nonexistent page in the PostScript data stream after the page object has been buffered for rendering.

8. The system of claim 7, wherein a portion of the object tokens define page boundaries in the PostScript data stream.

9. The system of claim 7, wherein the assembler is further operable to divide a total number of page objects in the PostScript data stream by a total number of the data paths and buffer about a same number of page objects in each data path.

10. The system of claim 7, wherein the assembler is further operable to synchronize PostScript interpreting by the PostScript interpreter with identifying object tokens by the PostScript token processor to correctly associate each object token with a PostScript page.

11. The system of claim 7, further comprising a buffer operable to store each of the object tokens according to their respective page objects.

12. A printing system, comprising:
- a print controller operable to render a PostScript data stream, wherein the PostScript data stream comprises PostScript parameters that are not Document Structure Conventions (DSC) compliant, wherein the print controller comprises:
  - a PostScript token processor operable to receive the PostScript data stream and identify object tokens in the PostScript data stream, wherein an object token is operable to generate a PostScript object or execute a PostScript operation;
  - an assembler operable to parse the object tokens into a plurality of page objects;
  - a PostScript interpreter operable to interpret the page objects for rendering, wherein the assembler is further operable to separate the interpreted page objects into a plurality of data paths for rasterization of the page objects through data paths on a page by page basis; and
- a printer operable to print the rendered page objects onto a tangible medium,
- wherein the assembler is further operable to buffer each of the page objects for rendering and generate a null page object for each page object that indicates a nonexistent page in the PostScript data stream after the page object has been buffered for rendering.

13. The system of claim 12, wherein a portion of the object tokens define page boundaries in the PostScript data stream.

14. The system of claim 12, wherein the assembler is further operable to divide a total number of page objects in the PostScript data stream by a total number of the data paths and buffer about a same number of page objects in each data path.

15. The system of claim 12, wherein the assembler is further operable to synchronize PostScript interpreting by the PostScript interpreter with identifying object tokens by the PostScript token processor to correctly associate each object token with a PostScript page.

16. The system of claim 12, further comprising a buffer operable to store each of the object tokens according to their respective page objects.

17. The system of claim 12, further comprising a rasterizer operable to render the interpreted page objects for printing onto the tangible medium via the printer.

\* \* \* \* \*